US012509858B2

(12) United States Patent
Miyoshi et al.

(10) Patent No.: US 12,509,858 B2
(45) Date of Patent: Dec. 30, 2025

(54) WORK MACHINE

(71) Applicant: KOBELCO CONSTRUCTION MACHINERY CO., LTD., Hiroshima (JP)

(72) Inventors: Yuki Miyoshi, Hiroshima (JP); Koji Ueda, Hiroshima (JP); Kosuke Yanagibashi, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 18/708,415

(22) PCT Filed: Oct. 27, 2022

(86) PCT No.: PCT/JP2022/040202
§ 371 (c)(1),
(2) Date: May 8, 2024

(87) PCT Pub. No.: WO2023/100558
PCT Pub. Date: Jun. 8, 2023

(65) Prior Publication Data

US 2025/0012051 A1 Jan. 9, 2025

(30) Foreign Application Priority Data

Nov. 30, 2021 (JP) ................................ 2021-193728

(51) Int. Cl.
*E02F 9/22* (2006.01)
*F15B 11/16* (2006.01)
(Continued)

(52) U.S. Cl.
CPC ............ *E02F 9/226* (2013.01); *E02F 9/2235* (2013.01); *E02F 9/2296* (2013.01);
(Continued)

(58) Field of Classification Search
CPC ... F15B 11/165; F15B 11/167; F15B 2211/36; F15B 2211/6313; F15B 2211/6316;
(Continued)

(56) References Cited

U.S. PATENT DOCUMENTS 5,005,466 A * 4/1991 Miyaoka ............... E02F 9/2203
91/461
10,030,355 B2 * 7/2018 Yamashita ............ E02F 9/2271
(Continued)

FOREIGN PATENT DOCUMENTS

| | | |
|---|---|---|
| CN | 111733919 A | 10/2020 |
| EP | 3 875 696 A1 | 9/2021 |
| JP | 2011-75045 A | 4/2011 |

OTHER PUBLICATIONS

International Search Report mailed on Dec. 6, 2022 in PCT/JP2022/040202 filed on Oct. 27, 2022, 2 pages.
(Continued)

*Primary Examiner* — Michael Leslie
(74) *Attorney, Agent, or Firm* — Oblon, McClelland, Maier & Neustadt, L.L.P.

(57) ABSTRACT

A work machine capable of preventing cavitation more effectively. The work machine includes a work device, a variable displacement hydraulic pump, a hydraulic actuator, a posture detector, a control valve, an operation unit, an operation detector, and a controller. The controller judges whether or not a work operation detected by the operation detector is a low-pressure operation based on posture information acquired by the posture detector, and increases the pump capacity of the hydraulic pump when judging that the work operation is the low-pressure operation.

6 Claims, 9 Drawing Sheets

(51) Int. Cl.
*F15B 11/17* (2006.01)
*F15B 21/047* (2019.01)

(52) U.S. Cl.
CPC .......... *F15B 11/165* (2013.01); *F15B 11/167* (2013.01); *F15B 11/17* (2013.01); *F15B 21/047* (2013.01); *F15B 2211/20523* (2013.01); *F15B 2211/20546* (2013.01); *F15B 2211/329* (2013.01); *F15B 2211/6313* (2013.01); *F15B 2211/6316* (2013.01); *F15B 2211/633* (2013.01); *F15B 2211/6652* (2013.01); *F15B 2211/7053* (2013.01); *F15B 2211/8609* (2013.01)

(58) Field of Classification Search
CPC ............ F15B 2211/6346; E02F 9/2203; E02F 9/2232; E02F 9/2235; E02F 9/226
See application file for complete search history.

(56) References Cited

U.S. PATENT DOCUMENTS

| | | | | |
|---|---|---|---|---|
| 10,161,423 | B2 * | 12/2018 | Rampen | F15B 11/162 |
| 10,344,781 | B2 * | 7/2019 | Kamoshita | E02F 9/2267 |
| 11,499,296 | B2 * | 11/2022 | Kai | F15B 13/0416 |

OTHER PUBLICATIONS

Extended European Search Report issued Jan. 14, 2025, in corresponding European Patent Application No. 22900991.5, 11 pages.

* cited by examiner

WORK MACHINE

TECHNICAL FIELD

The present invention relates to a work machine including a hydraulic pump.

BACKGROUND ART

Conventionally known is a technique to prevent cavitation in a hydraulic work machine, for example, a technique for preventing a low-pressure state from being caused by shortage of a makeup flow rate to a hydraulic-fluid supply side of a hydraulic actuator such as a bucket cylinder or a turning motor.

Patent Literature 1 discloses a hydraulic control device for a hydraulic work machine including a first hydraulic pump and a second hydraulic pump. When the discharge flow rate of the second hydraulic pump is small, the hydraulic control device increases not only the discharge flow rate of the second hydraulic pump but also the discharge flow rate of the first hydraulic pump. This increases the flow rate and pressure of the hydraulic fluid flowing through a tank fluid path, thereby increasing the flow rate of the hydraulic fluid that is made up (supplied) to the bottom side of a bucket cylinder through a makeup check valve. The shortage of the hydraulic fluid on the bottom side of the bucket cylinder is thereby recovered, and the bottom side of the bucket cylinder (7) is restrained from being negative.

In the device, however, the hydraulic fluid increased by an increase in the discharge flow rate of the first hydraulic pump flows to the tank, which involves remarkable limitation on the prevention of cavitation.

CITATION LIST

Patent Literature

Patent Literature 1: Japanese Unexamined Patent Publication No. 2011-75045

SUMMARY OF INVENTION

It is an object of the present invention to provide a work machine including a hydraulic pump, the work machine being capable of effectively preventing cavitation.

Provided is a work machine including a work device, a pump unit, a hydraulic actuator, a posture detector, a control valve, an operation unit, and a controller. The pump unit includes a variable displacement hydraulic pump having a variable pump capacity. The hydraulic actuator is driven by hydraulic fluid supplied from the pump unit to actuate the work device. The posture detector acquires posture information that is information about a posture of the work device. The control valve is disposed between the pump unit and the hydraulic actuator and performs an action to change supply of hydraulic fluid from the pump unit to the hydraulic actuator. The operation unit allows a work operation for making the control valve perform the action to be applied to the operation unit. The operation detector detects the work operation applied to the operation unit. The controller judges whether or not the work operation detected by the operation detector is a low-pressure operation based on the posture information acquired by the posture detector, and increases the pump capacity of the variable displacement hydraulic pump when judging that the work operation is the low-pressure operation. The low-pressure operation is an operation for making the control valve perform an action of allowing hydraulic fluid to be supplied from the pump unit to a low-pressure side of the hydraulic actuator.

DETAILED DESCRIPTION

A preferred embodiment of the present invention will be described with reference to FIGS. 1 to 12.

Figure 1:
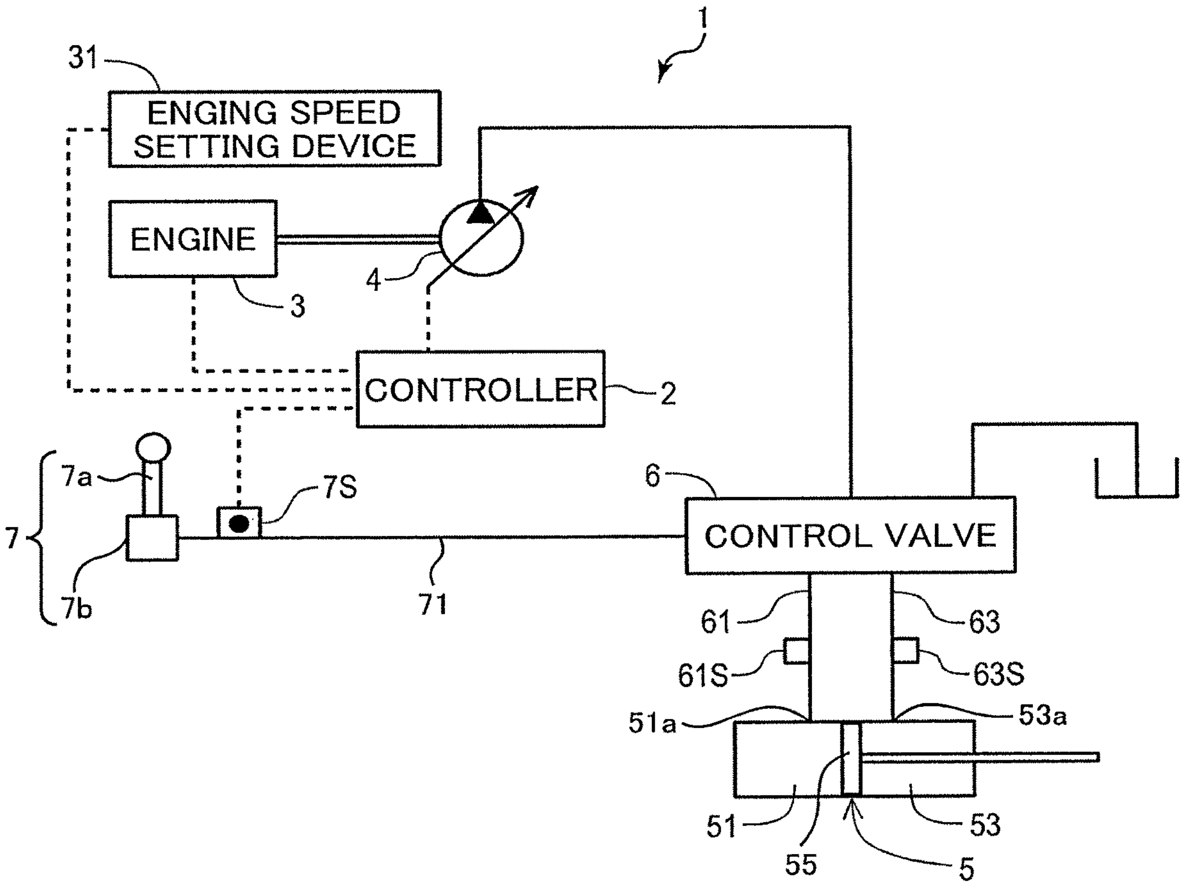
FIG. 1 is a diagram showing main elements of a hydraulic excavator according to an embodiment of the present invention.
Figure 2:
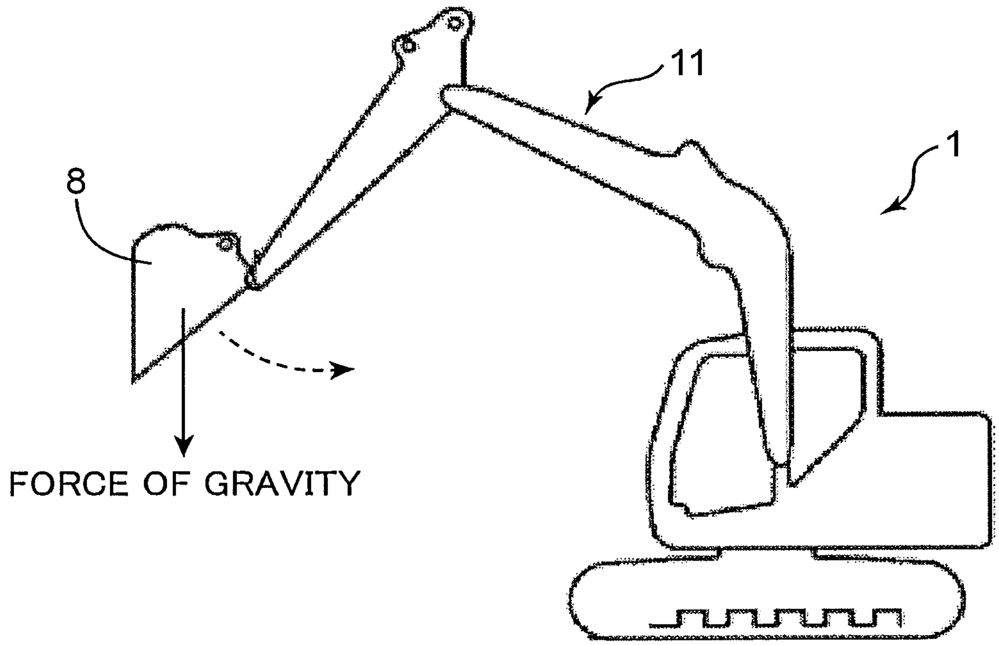
FIG. 2 is a side view showing the hydraulic excavator starting an excavation motion from an earth removal posture.

FIG. 1 shows main elements of a hydraulic excavator 1, which is a work machine according to the present embodiment. The main elements include a controller 2, an engine 3, a hydraulic pump 4, a hydraulic cylinder 5, a control valve 6, an operation unit 7, and a work arm 11 and a bucket 8 which are shown in FIG. 2.

The engine 3 drives the hydraulic pump 4. The hydraulic pump 4 constitutes a pump unit, configured to be driven by the engine 3 to thereby discharge hydraulic fluid. The hydraulic pump 4 is a variable displacement hydraulic pump having a variable pump capacity. As will be described later, the pump capacity of the hydraulic pump 4 is controlled by the controller 2. The hydraulic fluid discharged from the hydraulic pump 4 is supplied to the hydraulic cylinder 5 through the control valve 6.

The hydraulic cylinder 5 is a hydraulic actuator to be driven by hydraulic fluid supplied from the hydraulic pump 4, being a bucket cylinder in the present embodiment, which is driven by the hydraulic fluid to perform expansion and contraction motions to make the bucket 8 perform a work motion. The hydraulic cylinder 5 includes a piston 55, which partitions the inside of the hydraulic cylinder 5 into a head-side chamber 51 and a rod-side chamber 53. The hydraulic cylinder 5 has a first port 51*a* and a second port 53*a*, each of which is a supply/discharge port for hydraulic fluid, the head-side chamber 51 communicating with the first port 51*a*, and the rod-side chamber 53 communicating with the second port 53*a*. The hydraulic cylinder 5 is configured to made perform an expansion motion, which is a motion in an expansion direction, by the supply of hydraulic fluid to the head-side chamber 51 through the first port 51*a*, with discharge of hydraulic fluid from the rod-side chamber 53 through the second port 53*a*. Besides, the hydraulic cylinder 5 is configured to made perform a contraction motion, which is a motion in a contraction direction, by the supply of hydraulic fluid to the rod-side chamber 53 through the second port 53*a*, with discharge of hydraulic fluid from the head-side chamber 51 through the first port 51*a*.

The bucket 8 is a work device, attached to a tip part of the work arm 11 to be moved by the work arm 11. The work arm 11 includes a boom attached to the machine body of the hydraulic excavator 1 capably of rising and falling, and an arm connected to the distal end of the boom capably of rotational movement, the bucket 8 attached to the distal end of the arm. The bucket 8 is rotationally moved with respect to the work arm 11 by the expansion and contraction motions of the hydraulic cylinder 5, thereby performing a work motion. The work motion, in the present embodiment, includes an excavation motion and an earth removal motion.

The control valve 6 is a direction selector valve that switches a direction in which the hydraulic fluid discharged from the hydraulic pump 4 flows into the hydraulic cylinder 5. Specifically, the control valve 6 according to the present embodiment is a pilot-operated hydraulic selector valve having a head-side pilot port and a rod-side pilot port. The control valve 6 is opened by the supply of pilot pressure to the head-side pilot port so as to allow hydraulic fluid to be supplied to the head-side chamber 51 of the hydraulic cylinder 5 through a fluid passage 61 and the first port 51*a*. The control valve 6 is opened by the supply of pilot pressure to the rod-side pilot port so as to allow hydraulic fluid to be supplied to the rod-side chamber 53 of the hydraulic cylinder 5 through the second port 53*a* and the fluid passage 63.

The control valve 6 is a flow regulating valve having a variable opening degree. Specifically, the opening degree of the control valve 6 is changed so as to allow hydraulic fluid to flow at a flow rate that is increased with an increase in the pilot pressure that is input to the control valve 6. The regulation of the flow rate by the control valve 6 allows respective speeds of the expansion and contraction motions of the hydraulic cylinder 5 and the work motion (rotational movement) of the bucket 8 associated with the expansion and contraction motions to be controlled.

The operation unit 7 allows a work operation to be applied to the operation unit 7. The work operation is an operation to be applied to the operation unit 7 for making the control valve 6 perform an action to make the hydraulic cylinder 5 perform the expansion and contraction motions to make the bucket 8 perform the work motion. The operation unit 7 according to the present embodiment includes an operation lever 7*a* and a pilot valve 7*b*. The operation lever 7*a* allows the work operation to be applied to the operation lever 7*a* to rotationally move the operation lever 7*a* in the direction of the work operation. The pilot valve 7*b* is connected to each of the head-side pilot port and the rod-side pilot port of the control valve 6 through a pilot line 71. The pilot valve 7*b* is opened in conjunction with the operation lever 7*a*, allowing pilot pressure to be input to the control valve 6 through the pilot line 71 and changing the pilot pressure in accordance with the magnitude of the work operation applied to the operation lever 7*a*, namely, an operation amount.

As shown in FIG. 1, the controller 2 is connected with an engine speed setting device 31 for setting the rotation speed of the engine 3. The controller 2 controls the drive of the engine 3 so as to make the engine 3 rotate at the rotation speed set by the engine speed setting device 31.

The fluid passage 61 is provided with a head-pressure sensor 61S, and the fluid passage 63 is provided with a rod-pressure sensor 63S. The head-pressure sensor 61S detects a head pressure, which is the pressure of the hydraulic fluid supplied from the control valve 6 to the head-side chamber 51 through the fluid passage 61, being substantially equal to the pressure in the head-side chamber 51. The rod-pressure sensor 63S detects a rod pressure, which is the pressure of the hydraulic fluid supplied to the rod-side chamber 53, being substantially equal to the pressure in the rod-side chamber 53. Each of the head-pressure sensor 61S and the rod-pressure sensor 63S is a cylinder pressure detection sensor that detects a cylinder pressure, which is the working pressure of the hydraulic cylinder 5.

The head-pressure sensor 61S and the rod-pressure sensor 63S are connected to the controller 2. The head-pressure sensor 61S inputs an electric signal corresponding to the head pressure, namely, a head pressure detection signal, to the controller 2. Similarly, the rod-pressure sensor 63S inputs an electric signal corresponding to the rod pressure, namely, a rod pressure detection signal, to the controller 2.

The pilot line 71 is provided with a pilot pressure sensor 7S. The pilot pressure sensor 7S detects a pilot pressure to be input from the operation unit 7 to the control valve 6 through the pilot line 71. Since the pilot pressure corresponds to the operation amount of the work operation, the pilot pressure sensor 7S serves as an operation detector that detects the work operation. The pilot pressure sensor 7S is connected to the controller 2 to input an electric signal corresponding to the pilot pressure, namely, an operation detection signal, which is an electric signal corresponding to the operation amount, to the controller 2. The operation detector that detects the work operation, alternatively, may be an angle sensor that detects the tilt angle of the operation lever 7*a*.

Next will be described the expansion and contraction motions of the hydraulic cylinder 5 for making the bucket 8 in the earth removal posture perform the excavation motion, with reference to FIGS. 2 to 5. The earth removal posture is a posture in which the bucket 8 having been raised to a suitable height by the work arm 11 as shown in FIG. 2 is opened downward to allow the earth and sand in the bucket 8 to fall, and the excavation motion is a motion of the bucket 8 to excavate the ground surface to scoop the earth and sand.

Figure 3:
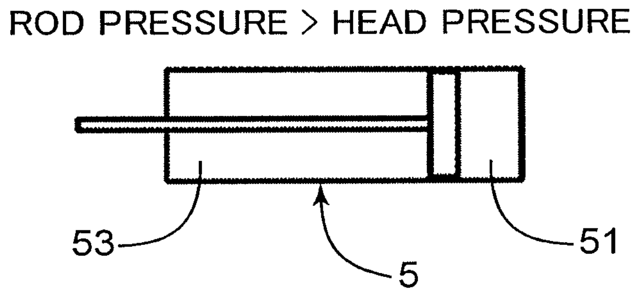
FIG. 3 is a cross-sectional side view showing a hydraulic cylinder when the hydraulic excavator is in the state shown in FIG. 2.

Bringing the bucket 8 into the earth removal posture as shown in FIG. 2, that is, the posture of being opened downward, requires the hydraulic cylinder 5 to perform the contraction motion that is a motion in the contraction direction as shown in FIG. 3. The contraction motion of the hydraulic cylinder 5 requires the supply of hydraulic fluid from the hydraulic pump 4 to the rod-side chamber 53 of the hydraulic cylinder 5 and the return of hydraulic fluid in the head-side chamber 51 to the tank. Hence, the pressure of the hydraulic fluid in the head-side chamber 51 for making the hydraulic cylinder 5 perform the contraction motion, namely, the head pressure, is lower than the pressure of the hydraulic fluid in the rod-side chamber 53, namely, the rod pressure.

Figure 4:
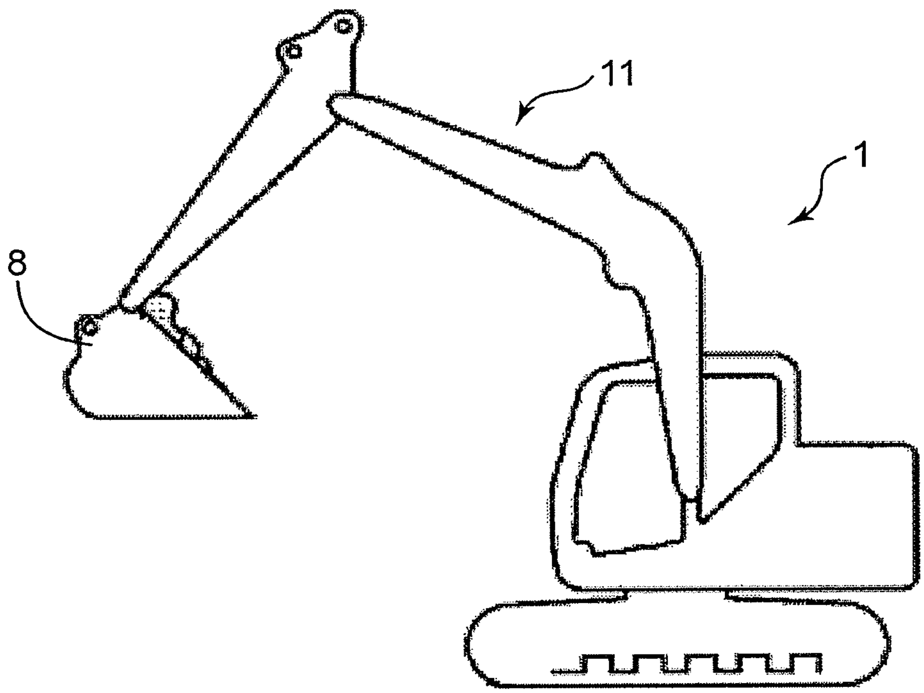
FIG. 4 is a side view showing the hydraulic excavator having finished the excavation motion.
Figure 5:
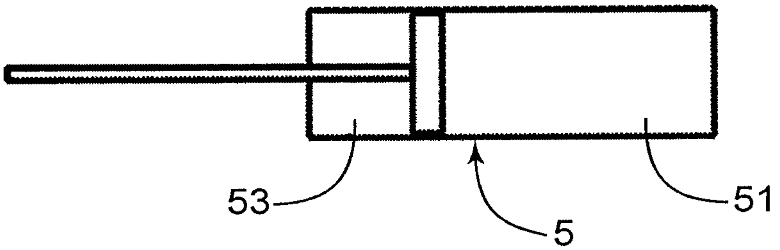
FIG. 5 is a cross-sectional side view showing the hydraulic cylinder when the hydraulic excavator is in the state shown in FIG. 4.

To make the bucket 8 perform the excavation motion from the earth removal posture, it is necessary to rotationally move the bucket 8 to the posture shown in FIG. 4, in an embracement direction, that is, counterclockwise in FIG. 2, with respect to the work arm 11, with the proper vertical movement and forward or backward movement of the bucket 8 caused by the work arm 11. The rotational movement of the bucket 8 requires the hydraulic cylinder 5 to perform the expansion motion, which is a motion in an expansion direction, from the contraction state shown in FIG. 3 to the state shown in FIG. 5. The expansion motion of the hydraulic cylinder 5 requires the supply of hydraulic fluid from the hydraulic pump 4 to the head-side chamber 51 and the return of hydraulic fluid in the rod-side chamber 53 to the tank.

Thus, making the bucket 8 perform the excavation motion from the earth removal posture, that is, rotationally moving the bucket 8 in the embracement direction, requires the supply of hydraulic fluid to the head-side chamber 51, the pressure in which is lower than that in the rod-side chamber 53. However, the force of gravity acting on the bucket 8 in the earth removal posture also acts in a direction of rotationally moving the bucket 8 in the embracement direction (counterclockwise direction in FIGS. 2 and 4), hindering the supply of hydraulic fluid to the head-side chamber 51 from following the expansion of the hydraulic cylinder 5 along with the rotational movement of the bucket 8 due to the gravity, which may cause a low pressure, or negative pressure in some cases, in the head-side chamber 51.

To restrain the head-side chamber 51 from thus being brought into the low-pressure state, the controller 2 according to the present embodiment judges whether or not the work operation applied to the operation unit 7 corresponds to a low-pressure operation, and performs control to increase the pump capacity when judging the work operation to be the low-pressure operation. The low-pressure operation is an operation for making the control valve 6 perform an action for allowing hydraulic fluid to be supplied to the low-pressure side of the hydraulic cylinder 5, namely, the head-side chamber 51 when the hydraulic cylinder 5 performs the expansion motion. Hereinafter will be specifically described the control for the excavation motion in consideration of the low-pressure operation with reference to the flowchart of FIG. 10.

The controller 2 compares the head pressure detected by the head-pressure sensor 61S with the rod pressure detected by the rod-pressure sensor 63S (step S11). Only when judging that the head pressure is lower than the rod pressure (YES in step S11), that is, only when judging that the head-side chamber 51 is the low-pressure side of the hydraulic cylinder 5, the controller 2 estimates the bucket 8 to be in the earth removal posture of being opened downward (step S12) and performs the following processing based on the estimation.

The controller 2 judges whether or not a low-pressure operation is applied to the operation unit 7, based on the pilot pressure detected by the pilot pressure sensor 7S (step S12). When the bucket 8 is in the earth removal posture shown in FIG. 2, the low-pressure operation is a work operation for making the control valve 6 perform an action to allow hydraulic fluid discharged from the hydraulic pump 4 to be supplied to the low-pressure side of the hydraulic cylinder 5, namely, the head-side chamber 51, that is, an operation for moving the bucket 8 in the earth removal posture, in the embracement direction. When judging that the low-pressure operation, which is an operation for allowing hydraulic fluid to be supplied to the head-side chamber 51 as the low-pressure side of the hydraulic cylinder 5, is applied to the operation unit 7 (YES in step S13), the controller 2 executes the following pump capacity control (steps S14 to S16).

Figure 12:
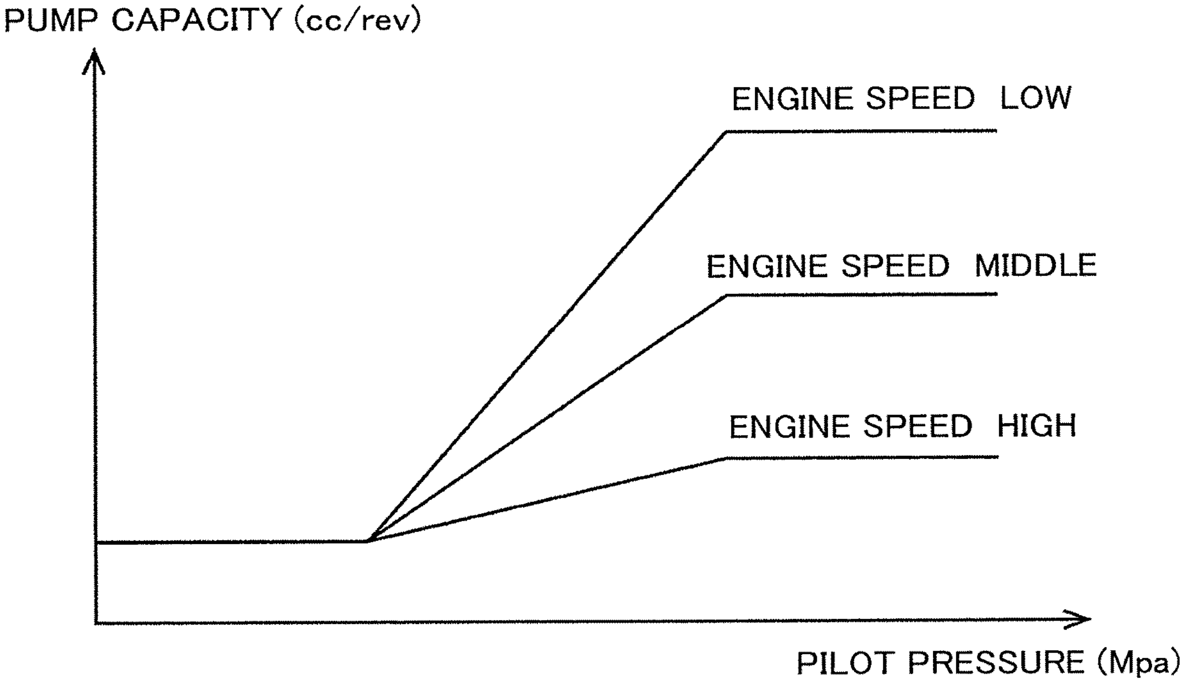
FIG. 12 is a graph showing a relationship between a pilot pressure and the pump capacity with respect to each of different engine revolutions.

In step S14, the controller 2 judges whether or not the engine speed is higher than a predetermined rotation speed. When judging that the engine speed is higher than the predetermined rotation speed (YES in step S14), the controller 2 sets the pump capacity of the hydraulic pump 4 according to the pilot pressure, that is, according to the operation amount (step S15). Specifically, the controller 2 stores the relationship between the pilot pressure and the pump capacity as shown in FIG. 12, the relationship varied depending on the engine speed, and determines the pump capacity based on the relationship and the pilot pressure. When the engine speed is higher than the predetermined rotation speed as described above (step S14), the controller 2 sets the pump capacity corresponding to the pilot pressure detected by the pilot pressure sensor 7S, based on the graph corresponding to the "ENGINE SPEED HIGH", which is the case where the engine speed is higher than the predetermined rotation speed, among the plurality of graphs shown in FIG. 12 (step S15). The controller 2, thus, executes a control to increase the pump capacity with an increase in the pilot pressure, that is, with an increase in the operation amount. In the example shown in FIG. 12, each of a minute operation range including the minimum value of the pilot pressure and a large-operation range including the maximum value is set as a dead zone, which is a range in which the pump capacity is kept constant regardless of a variation in the pilot pressure.

On the other hand, when judging that the engine speed is lower than the predetermined rotation speed (NO in step S14), the controller 2 sets the pump capacity of the hydraulic pump 4 based on both the pilot pressure and the engine speed (step S16). Specifically, as illustrated by respective graphs of the "ENGINE SPEED HIGH" "ENGINE SPEED MIDDLE" and "ENGINE SPEED LOW" (the case where the engine speed is lower than the predetermined rotation speed) in FIG. 12, the controller 2 makes such a determination of the pump capacity as to increase the pump capacity with an increase in the pilot pressure detected by the pilot pressure sensor 7S and as to increase the increase rate of the pump capacity to an increase in the pilot pressure, with a decrease in the engine speed. For example, in the case where the engine speed is in a middle level corresponding to the graph of the "ENGINE SPEED MIDDLE" in FIG. 12, the controller 2 renders the increase rate of the pump capacity to an increase in the pilot pressure greater than the increase rate in the case where the engine speed is such a high rotation speed as to correspond to the graph of the "ENGINE SPEED HIGH" in FIG. 12. On the other hand, in the case where the engine speed is such a low rotation speed as to correspond to the graph of the "ENGINE SPEED LOW" in FIG. 12, the controller 2 renders the increase rate of the pump capacity to an increase in the pilot pressure greater than the increase rate in the case where the engine speed is in the middle level corresponding to the graph of the "ENGINE SPEED MIDDLE" in FIG. 12.

Figure 6:
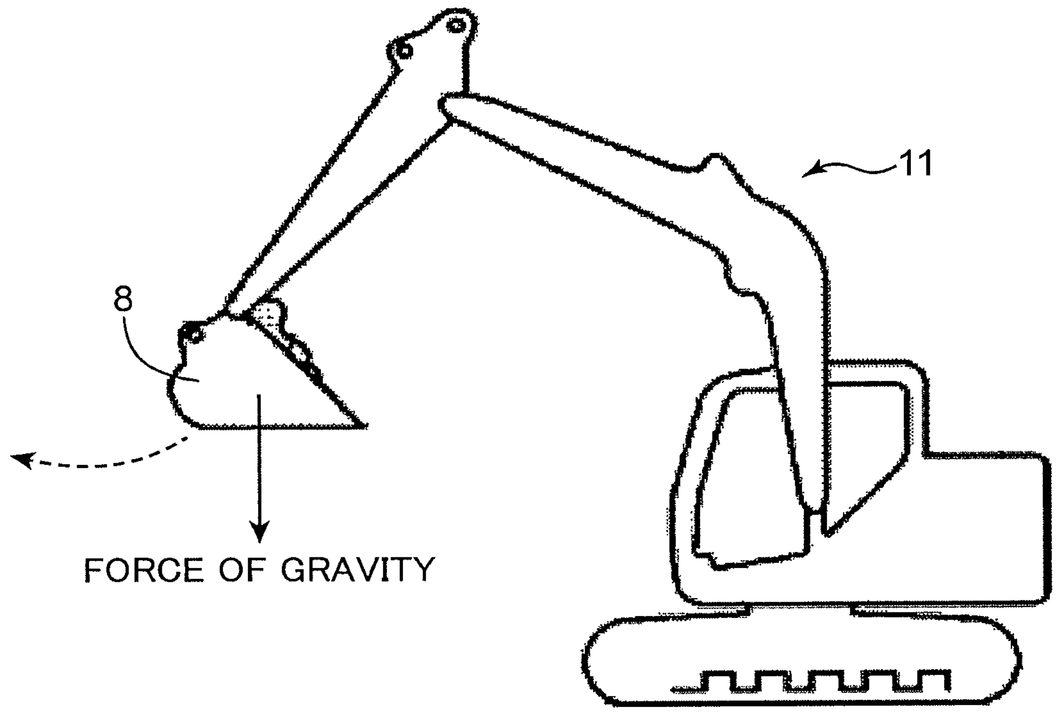
FIG. 6 is a side view showing the hydraulic excavator starting the earth removal motion from the embracement posture.

Next will be described the expansion and contraction motions of the hydraulic cylinder 5 for making the bucket 8 in an embracement posture perform the earth removal motion with reference to FIGS. 6 to 9. As shown in FIG. 6, the embracement posture is a posture in which the bucket 8 having been raised to a suitable height by the work arm 11 is opened upward to hold the earth and sand, and the earth removal motion is a motion of releasing downward the earth and sand that had been held by the bucket 8 to drop it.

Figure 7:
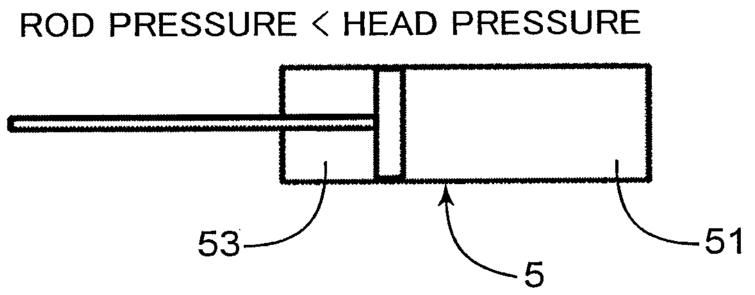
FIG. 7 is a cross-sectional side view showing the hydraulic cylinder when the hydraulic excavator is in the state shown in FIG. 6.

Bringing the bucket 8 into the embracement posture as shown in FIG. 6, that is, the posture of being opened upward, requires the hydraulic cylinder 5 to perform the expansion motion as shown in FIG. 7. The expansion motion of the hydraulic cylinder 5 requires the supply of hydraulic fluid from the hydraulic pump 4 to the head-side chamber 51 of the hydraulic cylinder 5 and the return of hydraulic fluid in the rod-side chamber 53 to the tank. Hence, the pressure of the hydraulic fluid in the rod-side chamber 53, namely, the rod pressure, when the hydraulic cylinder 5 performs the expansion motion is lower than the pressure of the hydraulic fluid in the head-side chamber 51, namely, the head pressure.

Figure 8:
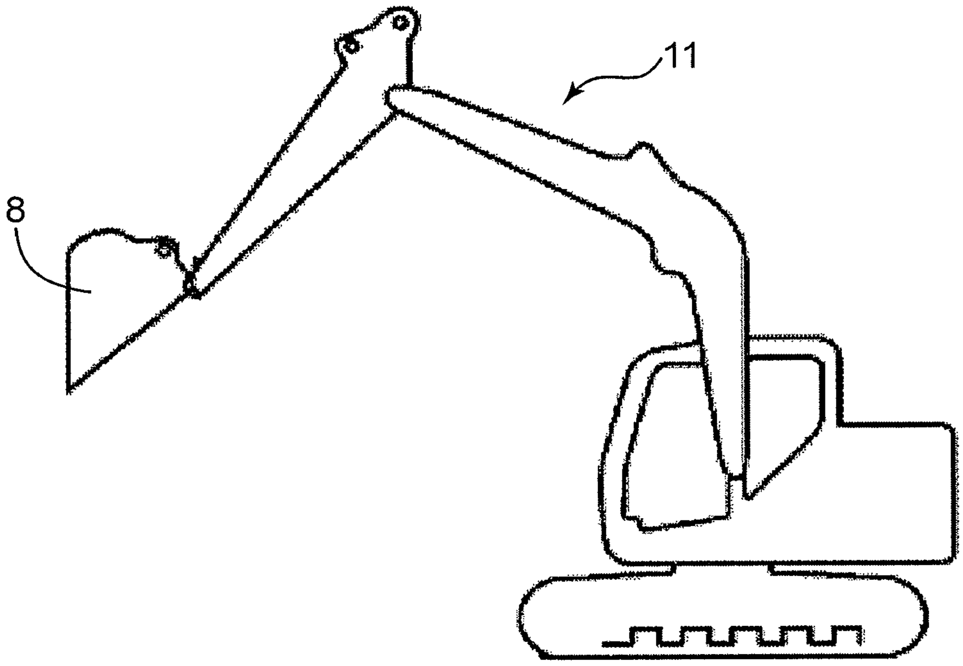
FIG. 8 is a side view showing the hydraulic excavator having finished the earth removal motion.
Figure 9:
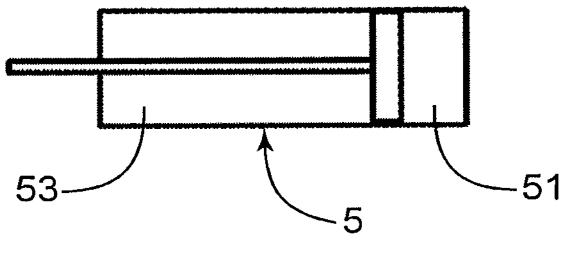
FIG. 9 is a cross-sectional side view showing the hydraulic cylinder when the hydraulic excavator is in the state shown in FIG. 8.

To make the bucket 8 perform the earth removal motion from the embracement posture, it is necessary to rotationally move the bucket 8 to the posture shown in FIG. 8, in an earth removal direction, that is, clockwise in FIG. 2, with respect to the work arm 11, with the proper vertical movement and forward or backward movement of the bucket 8 caused by the work arm 11. The rotational movement of the bucket 8 requires the hydraulic cylinder 5 to perform the contraction motion, which is a motion in the contraction direction, from the expansion state shown in FIG. 7 to the state shown in FIG. 9. The contraction motion of the hydraulic cylinder 5 requires the return of hydraulic fluid in the head-side chamber 51 to the tank and the supply of hydraulic fluid from the hydraulic pump 4 to the rod-side chamber 53.

Thus, making the bucket 8 perform the earth removal motion from the embracement posture, that is, rotationally moving the bucket 8 in the earth removal direction, requires the supply of hydraulic fluid to the head-side chamber 51, the pressure in which is lower than that in the head-side chamber 51. However, the force of gravity acting on the bucket 8 in the embracement posture also acts in a direction of rotationally moving the bucket 8 in the earth removal direction, hindering the supply of hydraulic fluid to the head-side chamber 51 from following the contraction of the hydraulic cylinder 5 along with the rotational movement of the bucket 8 due to the gravity, which may cause a low pressure, or negative pressure in some cases, in the rod-side chamber 53.

To restrain the rod-side chamber 53 from thus being brought into the low-pressure state, similarly to the mode of the excavation work from the earth removal posture, the controller 2 according to the present embodiment judges whether or not the work operation applied to the operation unit 7 corresponds to a low-pressure operation, and performs control to increase the pump capacity when judging the work operation to be the low-pressure operation. The low-pressure operation when the hydraulic cylinder 5 performs the expansion motion is an operation for making hydraulic fluid supplied to the rod-side chamber 53 as the low-pressure side of the hydraulic cylinder 5. Hereinafter will be specifically described the control for the earth removal motion in consideration of the low-pressure operation with reference to the flowchart of FIG. 11.

The controller 2 compares the head pressure detected by the head-pressure sensor 61S with the rod pressure detected by the rod-pressure sensor 63S (step S21). Only when judging that the rod pressure is lower than the head pressure (YES in step S21), that is, only when judging that the rod-side chamber 53 is the low-pressure side of the hydraulic cylinder 5, the controller 2 estimates the bucket 8 to be in the embracement posture of being opened upward (step S22) and performs the following processing based on the estimation.

The controller 2 judges whether or not a low-pressure operation is applied to the operation unit 7, based on the pilot pressure detected by the pilot pressure sensor 7S (step S22). When the bucket 8 is in the embracement posture shown in FIG. 6, the low-pressure operation is a work operation for making the control valve 6 perform an action to allow hydraulic fluid discharged from the hydraulic pump 4 to be supplied to the low-pressure side of the hydraulic cylinder 5, namely, the rod-side chamber 53, that is, an operation for moving the bucket 8 in the embracement posture, in the earth removal direction. When judging that the low-pressure operation, which is an operation for allowing hydraulic fluid to be supplied to the head-side chamber 51 as the low-pressure side of the hydraulic cylinder 5, is applied to the operation unit 7 (YES in step S23), the controller 2 executes the pump capacity control (steps S24 to S26). This pump capacity control is the same as the control by the above-described processes of steps S14 to S16 in FIG. 10.

Figure 10:
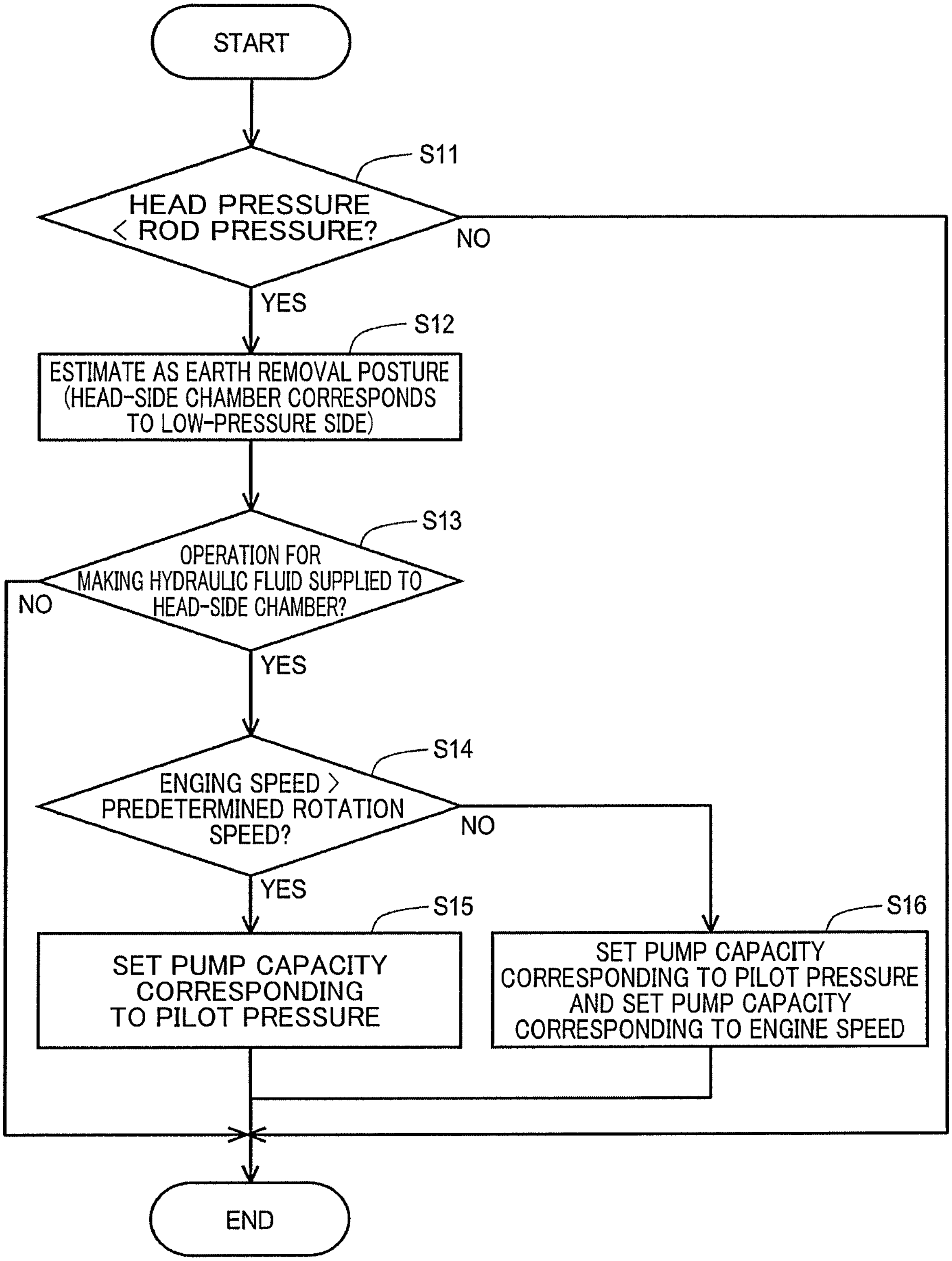
FIG. 10 is a flowchart showing control of a pump capacity for the excavation motion.
Figure 11:
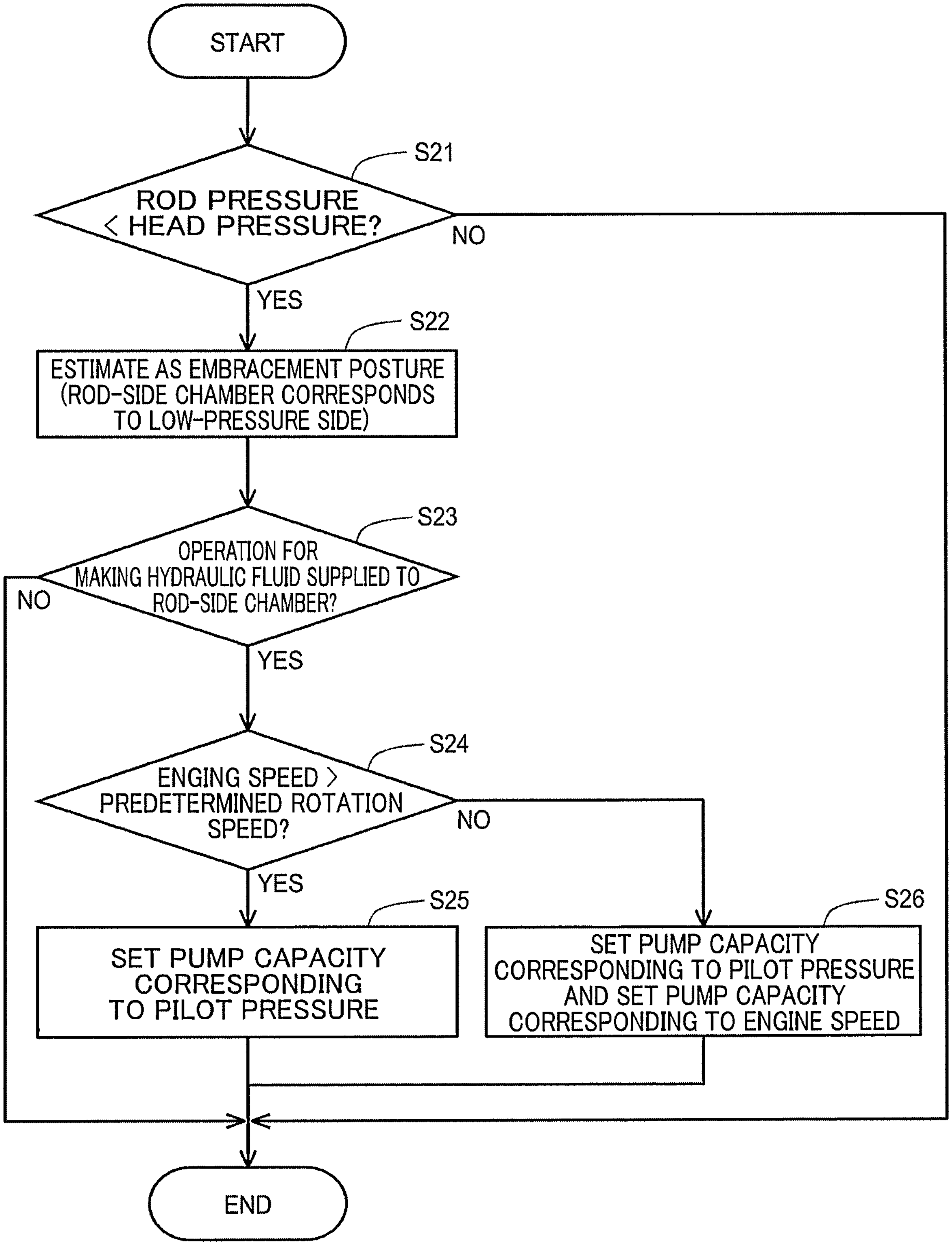
FIG. 11 is a flowchart showing control of a pump capacity for the earth removal motion.

Thus, when judging that the operation for making hydraulic fluid supplied to the head-side chamber 51, which is the low-pressure side of the hydraulic cylinder 5 when the bucket 8 is in the earth-discharging posture, is applied to the operation unit 7 (YES in step S13 in FIG. 10), and when judging that the operation for making hydraulic fluid supplied to the rod-side chamber 53, which is the low-pressure side of the hydraulic cylinder 5 when the bucket 8 is in the embracement posture, is applied to the operation unit 7 (YES in step S23 in FIG. 11), the controller 2 according to the present embodiment executes the control for increasing the pump capacity (step S15 or step S16 in FIG. 10, step S25 or step S26 in FIG. 11). The control makes it possible to reliably prevent negative pressure (cavitation) from occurring in the circuit for supplying hydraulic fluid to the hydraulic cylinder 5 with no use of any makeup line.

Besides, the controller 2 according to the embodiment, which quantitatively estimates the posture of the bucket 8 (earth removal posture or embracement posture) based on the comparison between the head pressure detected by the head-pressure sensor 61S and the rod pressure detected by the rod-pressure sensor 63S, can make more accurate judgement on whether or not an operation that induces the cavitation (low-pressure operation) is applied to the operation unit 7, based on the thus estimated posture.

In addition, the controller 2, which increases the increase rate of the pump capacity to an increase in the operation amount, with a decrease in the engine speed (see FIG. 12), that is, performs the control to increase the increase rate of the pump capacity to the operation amount, with a decrease in the engine speed, can reliably prevent cavitation even when the engine speed is significantly reduced.

Since the discharge amount of the hydraulic pump 4 tends to be insufficient when the engine speed is lower than a predetermined rotation speed (threshold), the above-described control performed by the controller 2 allows the pump capacity to be greatly increased with a decrease in the engine speed only when the engine speed is lower than the predetermined rotation speed, that is, only with a possibility of insufficiency of the pump discharge amount. This prevents, conversely, the pump capacity from being significantly increased despite that the engine speed is higher than the threshold to allow the discharge amount of the hydraulic fluid to be sufficient.

The work machine according to the present invention is not limited to the above-described embodiment, and various modifications and improvements can be made within the scope set forth in the claims.

While the pump unit that supplies hydraulic fluid to the hydraulic cylinder 5 in the above embodiment is composed of the single hydraulic pump 4, the pump unit according to the present invention may be constituted by a plurality of hydraulic pumps including at least one variable displacement hydraulic pump. In short, hydraulic fluid may be supplied from the plurality of hydraulic pumps to the hydraulic cylinder 5.

Figure 13:
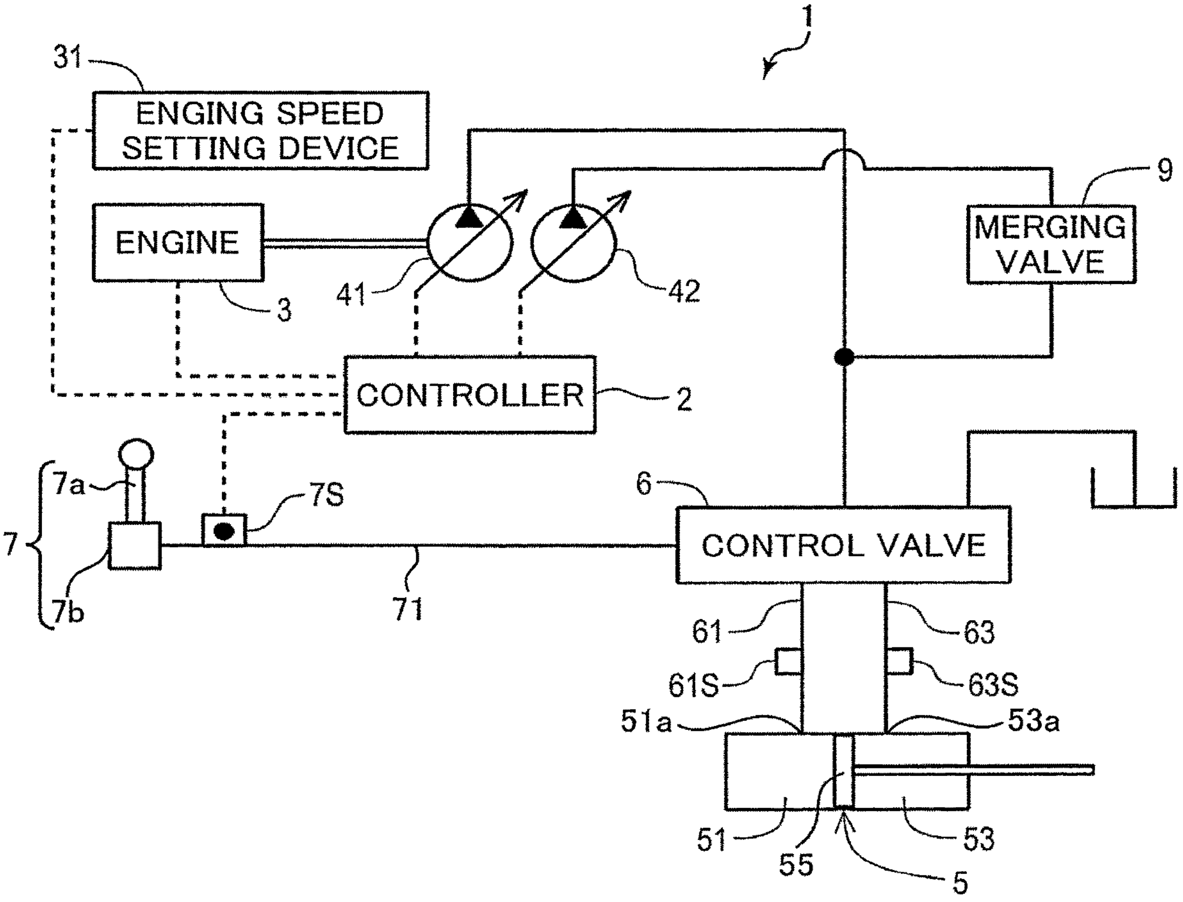
FIG. 13 is a diagram showing main elements of a hydraulic excavator according to a modification.

FIG. 13 shows a hydraulic excavator 101 according to a modification example. The hydraulic excavator 101 includes a pump unit including two hydraulic pumps 41 and 42 in place of a single hydraulic pump 4 shown in FIG. 1, and each of the hydraulic pumps 41 and 42 is composed of a variable displacement hydraulic pump. The hydraulic excavator 101 further includes a merging valve 9, which allows the hydraulic fluid discharged from the hydraulic pump 41 and the hydraulic fluid discharged from the hydraulic pump 42 to be merged with each other and supplied to the hydraulic cylinder 5. The hydraulic excavator 101 includes a controller 2 in the same manner as the hydraulic excavator 1 according to the embodiment, and the controller 2 is configured to increase the pump capacity of at least one of the hydraulic pumps 41, 42 when judging that the low-pressure operation is applied to the operation unit 7, similarly to step S13 of FIG. 10 or step S23 of FIG. 11 described above.

While the posture of the bucket 8 (the earth removal posture or the embracement posture), in the above embodiment, is estimated based on the comparison between the rod pressure and the head pressure detected by the head-pressure sensor 61S and the rod-pressure sensor 63S, respectively, the posture detector according to the present invention is not limited to the embodiment. The posture detector may include, for example, a plurality of angle sensors attached to the bucket 8, and the boom and the arm included in the work arm 11, respectively. Respective angles detected by the plurality of angle sensors allow the posture of the bucket 8 (for example, the earth removal posture or the embracement posture) to be estimated therefrom.

Although the control according to the embodiment changes the increase rate of the pump capacity to the operation amount in accordance with the engine speed, the control performed by the controller according to the present invention is not limited thereto. For example, the controller according to the present invention may be configured to increase the pump capacity by a certain amount regardless of the engine speed when judging that the low-pressure operation has been applied to the operation unit.

As has been described, there is provided a work machine including a hydraulic pump, the work machine being capable of effectively preventing cavitation. The work machine includes a work device, a pump unit, a hydraulic actuator, a posture detector, a control valve, an operation unit, and a controller. The pump unit includes a variable displacement hydraulic pump having a variable pump capacity. The hydraulic actuator is driven by hydraulic fluid supplied from the pump unit to actuate the work device. The posture detector acquires posture information that is information about a posture of the work device. The control valve is disposed between the pump unit and the hydraulic actuator and performs an action to change supply of hydraulic fluid from the pump unit to the hydraulic actuator. The operation unit allows a work operation for making the control valve perform the action to be applied to the operation unit. The operation detector detects the work operation applied to the operation unit. The controller judges whether or not the work operation detected by the operation detector is a low-pressure operation based on the posture information acquired by the posture detector, and increases the pump capacity of the variable displacement hydraulic pump when judging that the work operation is the low-pressure operation. The low-pressure operation is an operation for making the control valve perform an action of allowing hydraulic fluid to be supplied from the pump unit to a low-pressure side of the hydraulic actuator.

The controller, which judges whether or not the work operation detected by the operation detector is the low-pressure operation, based on the posture information acquired by the posture detector, and increases the pump capacity when judging that the work operation is the low-pressure operation, can reliably prevent cavitation in the hydraulic actuator.

For example, in the case where the hydraulic actuator has a first port and a second port through each of which hydraulic fluid can flow into and discharge from the hydraulic actuator, and the hydraulic actuator is configured to be made perform a motion in a first direction by supply of hydraulic fluid to the first port with discharge of hydraulic fluid through the second port and configured to be made perform a motion in a second direction by supply of hydraulic fluid to the second port, with discharge of hydraulic fluid through the first port, the low-pressure operation is an operation for making the control valve perform an action of allowing hydraulic fluid to be supplied to a port having a lower pressure selected from the first port and the second port.

The hydraulic actuator may be, for example, a hydraulic cylinder. The hydraulic cylinder has a head-side chamber communicating with the first port and a rod-side chamber communicating with the second port, configured to be made perform the action in an expansion direction by supply of hydraulic fluid to the head-side chamber through the first port, with discharge of hydraulic fluid from the rod-side chamber through the second port, and configured to be made perform the action in a contraction direction by supply of hydraulic fluid to the rod-side chamber through the second port, with discharge of hydraulic fluid from the head-side chamber through the first port. For this case, it is preferable that the posture detector is configured to detect each of a head pressure, which is a pressure of the head-side chamber of the hydraulic cylinder, and a rod pressure, which is a pressure of the rod-side chamber of the hydraulic cylinder, and the controller is configured to judge the operation for allowing the control valve to perform an action for allowing hydraulic fluid to be supplied to a hydraulic chamber having a lower pressure selected from the head-side chamber and the rod-side chamber to be the low-pressure operation.

The low-pressure operation can also be defined as an operation for moving the work device in the same direction as a direction in which the force of gravity acting on the work device moves the work device when the work device is in the posture detected by the posture detector.

In the work machine further including an engine that drives the variable displacement hydraulic pump, it is preferable that the controller is configured to increase the pump capacity at a degree that increases with a decrease in a rotation speed of the engine when judging that the work operation is the low-pressure operation.

For example, it is preferable that the controller is configured to increase the pump capacity at the greatest degree when judging that the operation is the low-pressure operation in a case where the rotation speed of the engine is equal to or less than a predetermined rotation speed.

The invention claimed is:

1. A work machine comprising:

a work device;

a pump unit including a first variable displacement hydraulic pump having a variable pump capacity and a second variable displacement hydraulic pump having a variable pump capacity;

a hydraulic cylinder that is driven by hydraulic fluid supplied from the pump unit to actuate the work device, and has a first port, a second port, a head-side chamber communicating with the first port and a rod-side chamber communicating with the second port, the first port allowing hydraulic fluid to be flowed into and discharged from the hydraulic cylinder, the second port allowing hydraulic fluid to be flowed into and discharged from the hydraulic cylinder;

a merging valve that allows hydraulic fluid discharged from the first variable displacement hydraulic pump and the hydraulic fluid discharged from the second variable displacement hydraulic pump to be merged with each other and supplied to the hydraulic cylinder, a posture detector that is configured to detect each of a head pressure, which is a pressure of the head-side chamber of the hydraulic cylinder, and a rod pressure, which is a pressure of the rod-side chamber of the hydraulic cylinder, and acquires posture information that is information about a posture of the work device based on the head pressure and the rod pressure;

a control valve disposed between the pump unit and the hydraulic cylinder and configured to perform an action to change supply of hydraulic fluid from the pump unit to the hydraulic cylinder by being switched between a state of allowing the hydraulic fluid merged by the merging valve to be supplied to the head-side chamber and a state of allowing the hydraulic fluid merged by the merging valve to be supplied to the rod-side chamber;

an operation unit that allows a work operation for making the control valve perform the action to be applied to the operation unit;

an operation detector that detects the work operation applied to the operation unit; and a controller configured to determine whether or not the work operation detected by the operation detector is a low-pressure operation for making the control valve perform an action for allowing hydraulic fluid to be supplied to a hydraulic chamber having a lower pressure selected from the head-side chamber and the rod-side chamber, based on the posture information acquired by the posture detector, wherein the controller is configured to increase the pump capacity of at least one of the first variable displacement hydraulic pump and the second variable displacement hydraulic pump as a result of the determination that the work operation is the low-pressure operation based on the posture information acquired by the posture detector.

2. The work machine according to claim 1, wherein: the hydraulic cylinder is configured to be made perform a motion in a first direction by supply of hydraulic fluid to the first port, with discharge of hydraulic fluid through the second port, and configured to be made perform a motion in a second direction by supply of hydraulic fluid to the second port, with discharge of hydraulic fluid through the first port; and the low-pressure operation is an operation for making the control valve perform an action of allowing hydraulic fluid to be supplied to a port having a lower pressure selected from the first port and the second port.

3. The work machine according to claim 2, wherein: the hydraulic cylinder configured to be made perform the action in an expansion direction by supply of hydraulic fluid to the head-side chamber through the first port, with discharge of hydraulic fluid from the rod-side chamber through the second port, and configured to be made perform the action in a contraction direction by supply of hydraulic fluid to the rod-side chamber through the second port, with discharge of hydraulic fluid from the head-side chamber through the first port.

4. The work machine according to claim 1, wherein the low-pressure operation is an operation for moving the work device in the same direction as a direction in which the force of gravity acting on the work device moves the work device when the work device is in the posture detected by the posture detector.

5. The work machine according to claim 1, further comprising an engine that drives the variable displacement hydraulic pump, wherein the controller is configured to increase the pump capacity at a degree that increases with a decrease in a rotation speed of the engine when judging that the work operation is the low-pressure operation.

6. The work machine according to claim 5, wherein the controller is configured to increase the pump capacity at the largest degree when judging that the operation is the low-pressure operation in a case where the rotation speed of the engine is equal to or less than a predetermined rotation speed.

* * * * *